United States Patent
Di Girolamo et al.

(10) Patent No.: US 10,560,852 B2
(45) Date of Patent: *Feb. 11, 2020

(54) METHOD AND APPARATUS FOR PERFORMING DISCONTINUOUS RECEPTION AND DOWNLINK INTER-FREQUENCY AND INTER-RADIO ACCESS TECHNOLOGY MEASUREMENTS IN CELL_FACH STATE

(71) Applicant: InterDigital Patent Holdings, Inc., Wilmington, DE (US)

(72) Inventors: Rocco Di Girolamo, Laval (CA); Diana Pani, Montreal (CA); Christopher R. Cave, Dollard-des-Ormeaux (CA); Paul Marinier, Brossard (CA); Vincent Roy, Longueuil (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/709,040

(22) Filed: Sep. 19, 2017

(65) Prior Publication Data

US 2018/0007566 A1 Jan. 4, 2018

Related U.S. Application Data

(63) Continuation of application No. 13/761,220, filed on Feb. 7, 2013, now Pat. No. 9,801,077, which is a (Continued)

(51) Int. Cl.
*H04W 24/00* (2009.01)
*H04L 12/26* (2006.01)
(Continued)

(52) U.S. Cl.
CPC ............. *H04W 24/00* (2013.01); *H04L 43/00* (2013.01); *H04W 36/0088* (2013.01); *H04L 43/16* (2013.01); *H04W 36/14* (2013.01)

(58) Field of Classification Search
None
See application file for complete search history.

(56) References Cited

U.S. PATENT DOCUMENTS 8,400,934 B2 3/2013 DiGirolamo et al.
8,548,524 B2 10/2013 Aoyama et al.
(Continued)

FOREIGN PATENT DOCUMENTS

CN 1794864 A 6/2006
CN 1794875 A 6/2006
(Continued)

OTHER PUBLICATIONS

3rd Generation Partnership Project (3GPP), R2-080099, "FACH Measurement Occasion Calculation", Huawei, 3GPP TSG-RAN WG2 #60bis, Seville, ES, Jan. 14-18, 2008, 3 pages.
(Continued)

*Primary Examiner* — Brian S Roberts
(74) *Attorney, Agent, or Firm* — Condo Roccia Koptiw LLP

(57) ABSTRACT

A method and apparatus of performing discontinuous reception (DRX) and downlink inter-frequency and inter-radio access technology (RAT) measurements in CELL_FACH state are disclosed. While in DRX mode, a wireless transmit/receive unite (WTRU) may perform inter-frequency and inter-RAT measurements in a measurement occasion that fall into a DRX period. The WTRU may take the measurements on first predetermined number of frame in which a DRX frame would coincide after a last reception frame if DRX operation was ongoing. The WTRU may periodically
(Continued)

wake up for downlink reception in CELL_FACH state in accordance with common DRX pattern that is common to all WTRUs in a cell or may wake up from DRX upon reception of the order and receiving a common traffic.

18 Claims, 4 Drawing Sheets

Related U.S. Application Data continuation of application No. 12/363,278, filed on Jan. 30, 2009, now Pat. No. 8,400,934.

(60) Provisional application No. 61/025,002, filed on Jan. 31, 2008, provisional application No. 61/025,354, filed on Feb. 1, 2008, provisional application No. 61/110,033, filed on Oct. 31, 2008.

(51) Int. Cl.
*H04W 36/00* (2009.01)
*H04W 36/14* (2009.01)

(56) References Cited

U.S. PATENT DOCUMENTS

| | | |
|---|---|---|
| 2005/0153751 A1 | 7/2005 | Bultan et al. |
| 2006/0062193 A1 | 3/2006 | Choi et al. |
| 2007/0030830 A1 | 2/2007 | Sagne et al. |
| 2007/0037594 A1 | 2/2007 | Palenius et al. |
| 2007/0129017 A1 | 6/2007 | Dalsgaard et al. |
| 2008/0076427 A1 | 3/2008 | Huang et al. |
| 2008/0170557 A1 | 7/2008 | Yin |
| 2008/0198796 A1 | 8/2008 | Jen |
| 2008/0287127 A1 | 11/2008 | Wu et al. |
| 2009/0092056 A1 | 4/2009 | Kitazoe |

FOREIGN PATENT DOCUMENTS

| | | |
|---|---|---|
| CN | 1806455 A | 7/2006 |
| CN | 1879349 A | 12/2006 |
| CN | 1981455 A | 6/2007 |
| CN | 101018351 A | 8/2007 |
| EP | 1467582 A1 | 10/2004 |
| EP | 1853081 A1 | 11/2007 |
| EP | 1871133 A1 | 12/2007 |
| EP | 1947779 A1 | 7/2008 |
| JP | 2003-509982 A | 3/2003 |
| JP | 2006-523392 A | 10/2006 |
| JP | 2007-511166 A | 4/2007 |
| JP | 2008-533883 A | 8/2008 |
| WO | WO 2001/020942 A1 | 3/2001 |
| WO | WO 2005/048529 A1 | 5/2005 |
| WO | WO 2005/109676 A1 | 11/2005 |
| WO | WO 2006/114058 A1 | 11/2006 |
| WO | WO 2007/022726 A1 | 3/2007 |
| WO | WO 2008/001726 A1 | 1/2008 |

OTHER PUBLICATIONS

3rd Generation Partnership Project (3GPP), R2-080362, "Cell_FACH DRX", Nokia Corporation, Nokia Siemens Networks, 3GPP TSG-RAN-WG2 Meeting #60, Sevilla, ES, Jan. 14-18, 2008, 3 pages.

3rd Generation Partnership Project (3GPP), R2-081048, "Cell_FACH DRX Scheme", Nokia Corporation, Nokia Siemens Networks, 3GPP TSG-RAN-WG2 Meeting #61, Sorrento, Italy, Feb. 11-15, 2008, 5 pages.

3rd Generation Partnership Project (3GPP), R2-086934, "Addition of HS-DPCCH Feedback in CELL_FACH", InterDigital, Nokia Siemens Networks, 3GPP TSG-WG2 Meeting #64, Prague, Czech Republic, Nov. 10-14, 2008, 8 pages.

3rd Generation Partnership Project (3GPP), R3-071173, "Changes to Management, handover, Paging and NAS Functions, Node and MBMS Content Synchronization, X2 UP Protocol Stack, and X2 Inter Cell Load Management", Ericsson, 3GPP TSG-RAN WG3 Meeting #55bis, Kobe, Japan, Mar. 7-11, 2007, 89 pages.

3rd Generation Partnership Project (3GPP), RP-070677, "Enhanced Uplink for CELL_FACH State in FDD", TSG-RAN #37 Meeting, Riga, Latvia, Sep. 11-14, 2007, 8 pages.

3rd Generation Partnership Project (3GPP), RP-070679, "Enhanced UE DRX for FDD", TSG-RAN #37 Meeting, Riga, Latvia, Sep. 11-14, 2007, 3 pages.

3rd Generation Partnership Project (3GPP), TS 25.214 V8.0.0, "Technical Specification Group Radio Access Network, Physical Layer Procedures (FDD) (Release 8)", Nov. 2007, 87 pages.

3rd Generation Partnership Project (3GPP), TS 25.214 V8.4.0, "Technical Specification Group Radio Access Network, Physical Layer Procedures (FDD) (Release 8)", Dec. 2008, 92 pages.

3rd Generation Partnership Project (3GPP), TS 25.331 V6.16.0, "Technical Specification Group Radio Access Network, Radio Resource Control (RRC), Protocol Specification (Release 6)", Dec. 2007, 1252 pages.

3rd Generation Partnership Project (3GPP), TS 25.331 V8.0.0, "Technical Specification Group Radio Access Network, Radio Resource Control (RRC), Protocol Specification (Release 8)", Sep. 2007, 1458 pages.

3rd Generation Partnership Project (3GPP), TS 25.331 V8.1.0, "Technical Specification Group Radio Access Network, Radio Resource Control (RRC), Protocol Specification (Release 8)", Dec. 2007, 1471 pages.

3rd Generation Partnership Project (3GPP), TS 25.331 V8.5.0, "Technical Specification Group Radio Access Network, Radio Resource Control (RRC), Protocol Specification (Release 8)", Dec. 2008, 1646 pages.

European Telecommunications Standards Institute (ETSI), TS 125 304 V7.4.0, "Universal Mobile Telecommunications System (UMTS), User Equipment (UE) Procedures in Idle Mode and Procedures for Cell Reselection in Connected Mode (3GPP TS 25.304 version 7.4.0 Release 7)", Jan. 2008, 43 pages.

Kitazoe, Masato, "Measurement Behaviour of DRX mode UE", U.S. Appl. No. 60/977,860, filed Oct. 5, 2007.

METHOD AND APPARATUS FOR PERFORMING DISCONTINUOUS RECEPTION AND DOWNLINK INTER-FREQUENCY AND INTER-RADIO ACCESS TECHNOLOGY MEASUREMENTS IN CELL_FACH STATE

CROSS REFERENCE TO RELATED APPLICATIONS

This application is a continuation of a U.S. patent application Ser. No. 13/761,220 filed Feb. 7, 2013; which is a continuation of U.S. patent application Ser. No. 12/363,278 filed Jan. 30, 2009, now issued as U.S. Pat. No. 8,400,934 on Mar. 19, 2013; which claims the benefit of U.S. provisional application Nos. 61/025,002 filed Jan. 31, 2008, 61/110,033 filed Feb. 1, 2008, and 61/110,033 filed Oct. 31, 2008 which are incorporated by reference as if fully set forth.

FIELD OF INVENTION

This application is related to wireless communications.

BACKGROUND

Discontinuous reception (DRX) and discontinuous transmission (DTX) were introduced in CELL_DCH state as part of the continuous packet connectivity (CPC) feature of third generation partnership project (3GPP) Release 7. DRX and DTX, applied to wireless transmit/receive units (WTRUs) in CELL_DCH state, allow the radio access network to maintain temporarily inactive WTRUs in CELL DCH state to reduce the interference caused by the WTRUs, (i.e., reduce the wasted system capacity), and reduce the WTRU battery consumption. In Release 7, a two-tiered DRX scheme was introduced in CELL_PCH state. Upon transition to CELL_PCH a WTRU enters a DRX mode using a shorter DRX cycle and after a period of inactivity the WTRU switches to a longer DRX cycle.

As part of the development of 3GPP Release 8, it has been agreed to enhance the WTRU operation in CELL_FACH state by allowing enhanced dedicated channel (E-DCH) transmission in lieu of random access channel (RACH), and by enabling DRX operation. WTRUs would use the legacy RACH ramp-up procedure to request a resource assignment, and would receive an acknowledgement indicating the E-DCH resource that has been allocated for the WTRUs. The resource is made up of a set of uplink channels (E-DCH dedicated physical data channel (E-DPDCH), E-DCH dedicated physical control channel (E-DPCCH)) and downlink channels (E-DCH HARQ indicator channel (E-HICH), E-DCH relative grant channel (E-RGCH), E-DCH absolute grant channel (E-AGCH)). The resource is taken from a small pool of shared E-DCH resources managed by the Node B. Once the WTRU completes uplink transmission, the resource is returned to the pool to be assigned to another WTRU. In addition, it was introduced to define a fixed DRX pattern that is in constant use for the whole time a WTRU is in CELL_FACH state except when a WTRU has E-DCH resources allocated. The DRX pattern comprises receive bursts followed by DRX periods. During these DRX periods, the network guarantees that it will not schedule high speed downlink shared channel (HS-DSCH) traffic to this WTRU.

A WTRU in CELL_FACH is required to perform measurements on cells on other frequencies and other radio access technologies (RATs). Such measurements are referred to as inter-frequency and inter-RAT measurements. The criteria to start these measurements and the cells to monitor are specified through broadcast system information. In order to allow the WTRU to measure cells on other frequencies and other RATs, the WTRU is provided with measurement gaps in the downlink transmissions. During these measurement gaps, the WTRU may tune its receiver to other frequencies or other RATs and make the necessary measurements.

While in CELL_FACH, the measurement gaps are referred to as FACH measurement occasions. The FACH measurement occasions define radio frames during which the network does not schedule any data for a WTRU, allowing the WTRU to take measurements on other frequencies or RATs.

When HS-DSCH reception in CELL_FACH is not supported, the FACH measurement occasions are defined to occur during frames where the SFN satisfies the following:

$$SFN \text{div } N = C\_RNTI \bmod M\_REP + n*M\_REP; \qquad \text{Equation (1)}$$

where C_RNTI is a cell specific WTRU address (cell RNTI), M_REP is the measurement occasion cycle length=$2^k$, k is the coefficient broadcast in the system information, N denotes the number of 10 ms frames in the measurement occasion, and n=0,1,2,3 . . . .

When HS-DSCH reception in CELL_FACH is supported, the FACH measurement occasions are defined to occur during frames where the SFN satisfies the following:

$$SFN = H\text{-}RNTI \bmod M\_REP + n*M\_REP; \qquad \text{Equation (2)}$$

where H-RNTI is an HS-DSCH radio network temporary identity which is the value stored in the variable H_RNTI, M_REP is the measurement occasion cycle length=$2^k$, and k is the FACH measurement occasion cycle length coefficient. When HS-DSCH reception in CELL_FACH is supported, a FACH measurement occasion of 10 ms-frame is repeated every M_REP frame.

While in CELL_FACH, the network may be required to send common traffic to all WTRUs. This common traffic may be either control-plane data or user-plane data. The control-plane data may be for all control traffic over broadcast. control channel (BCCH)/common control channel (CCCH). The control-plane data includes the following radio resource control (RRC) messages: CELL UPDATE CONFIRM, URA UPDATE CONFIRM, SYSTEM INFORMATION CHANGE INDICATION, or the like.

In addition, a number of multimedia broadcast multicast services (MBMS) related control messages over MBMS control channel (MCCH) and MBMS scheduling channel (MSCH) may require transmission to all WTRUs in CELL_FACH including: MBMS ACCESS INFORMATION, MBMS Common P-T-M RB Information, MBMS Current Cell P-T-M RB Information, MBMS General Information, MBMS Modified services Information, MBMS Neighbouring Cell P-T-M RB Information, MBMS Scheduling Information, MBMS Unmodified services Information, or the like. As for the user-plane data, this refers to traffic over common traffic channel (CTCH) and MBMS traffic channel (MTCH) for cell broadcasting services (CBS) and MBMS type services.

As the WTRU can keep the allocated E-DCH resources for some time, it is possible that this time overlaps with one of the WTRU FACH measurement occasions. If the WTRU is allowed to use the occasion for inter-frequency and inter-RAT measurements, then the WTRU will not have access to any of the downlink signaling channels (E-HICH, E-RGCH, E-AGCH) associated with the E-DCH resource. This is further complicated if the WTRU is operating with DRX enabled. The measurement occasions may fall on a DRX period, which may result in a failure of the WTRU taking inter-frequency or inter RST measurements because the WTRU receiver is not turned on. If the measurement occasions do not fan on the DRX period, this may result in the WTRU spending prolonged period of time not measuring the downlink channels. More specifically, if the WTRU just performs a DRX and then has to take a measurement on the other frequency the WTRU may not be able to receive any downlink traffic for DRX period plus measurement period. This may limit the data rates on the network side and cause additional delays.

Another problem occurs with common traffic that is to be sent to CELL_FACH WTRUs. As the DRX patterns are tied to the WTRU identity, the DRX patterns will not be synchronized between the WTRUs. As a result, there is no way for the network to transmit common traffic to all WTRUs within their awake times, (i.e., receive bursts). For BCCH traffic, (e.g., the SYSTEM INFORMATION CHANGE INDICATION message), the network may simply repeat the message to all WTRUs, (i.e., sending the message in enough continuous reception (CRX) periods in order to guarantee that all WTRUs have received it). However, this leads to a waste of downlink capacity as the message has to be repeated. Furthermore, if the WTRU DRX patterns are subsets of each other, (e.g., if the pattern of one WTRU repeats twice in the pattern of another WTRU), a WTRU may receive multiple BCCH messages.

SUMMARY

A method and apparatus of performing downlink inter-frequency and inter RAT measurements in CELL_FACH state are disclosed. The WTRU may ignore FACH measurement occasions during periods when the WTRU has an allocated E-DCH resource. While in DRX mode, a WTRU may perform inter-frequency and inter-RAT measurements during periods that fall into a DRX period. The WTRU may perform the measurements while the inactivity timer (T321) is running. The WTRU may take the measurements on first predetermined number of frame in which a DRX frame would coincide after a last reception frame if DRX operation was ongoing. The WTRU may wake up for downlink reception in CELL_FACH state in accordance with a common DRX pattern that is common to all WTRUs in a cell or may wake up from DRX upon reception of the order and receiving a common traffic.

BRIEF DESCRIPTION OF THE DRAWINGS

A more detailed understanding may be had from the following description, given by way of example in conjunction with the accompanying drawings wherein.

DETAILED DESCRIPTION

Figure 1:
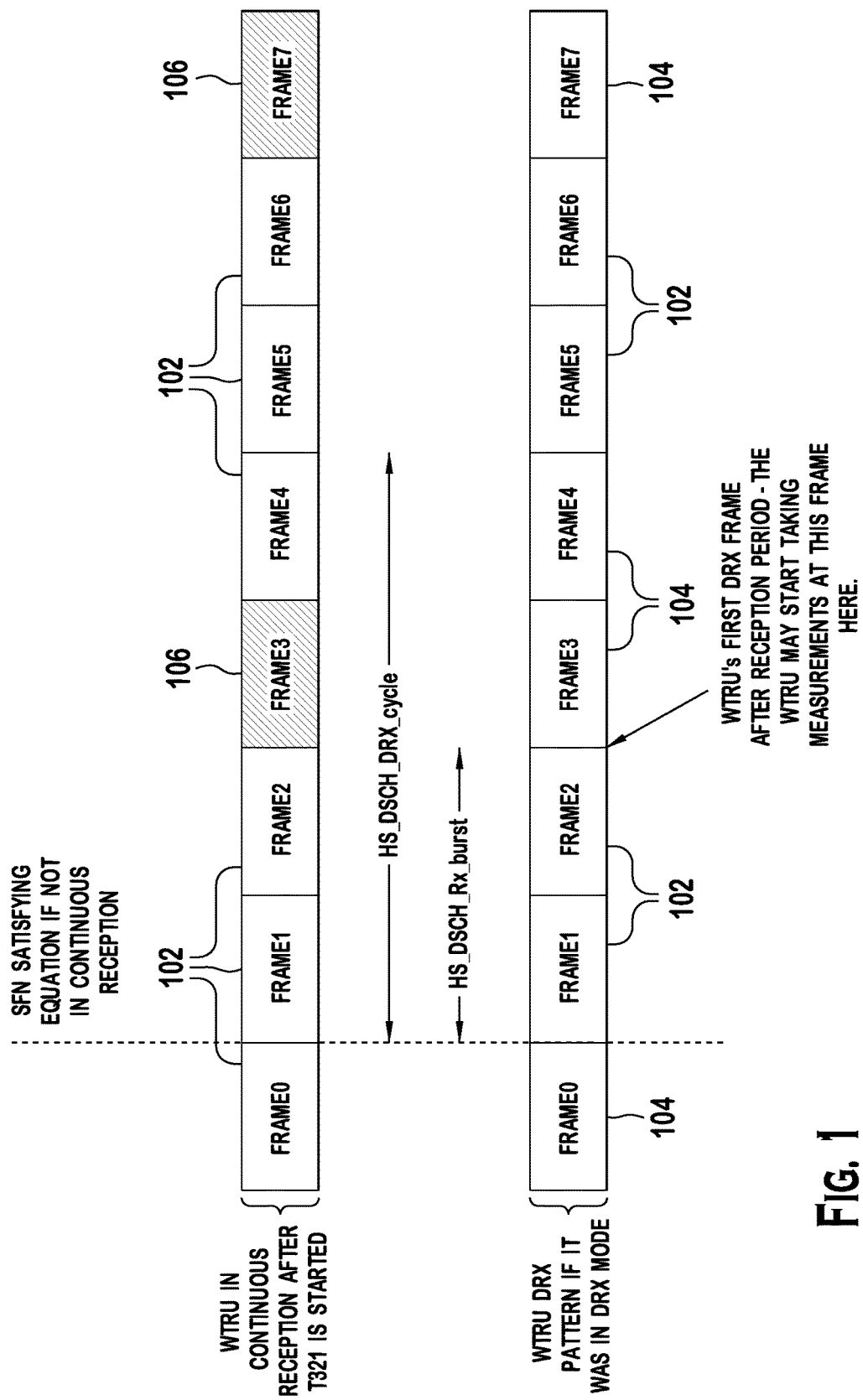
FIG. 1 shows an example implementation with the WTRU measuring according to the FACH measurement occasion while in continuous reception.

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node B" includes but is not limited to a base station, a site controller, an access point (AP), or any other type of interfacing device capable of operating in a wireless environment.

Hereinafter, the terminology "WTRU identity based DRX pattern" will be used to refer to DRX patterns that are derived from the WTRU identity. When referred to hereafter, the terminology "DRX operation is disabled" or "DRX disabled" refers to periods when a WTRU continuously receives, (e.g., when a WTRU its CELL_FACH is allocated an E-DCH resource, or has the inactivity timer (T321) running). When referred to hereafter, the terminology "DRX operation is configured" or "DRX configured" refers to the state that the WTRU is capable of operating in DRX mode. For example, the WTRU may operate in DRX mode where both the WTRU and the network support DRX in CELL_FACH and the WTRU supports E-DCH in CELL_FACH and Idle, or where both the WTRU and the network support DRX in CELL_FACH and the network allows downlink activity to start and restart the inactivity timer (T321). When referred to hereafter, the terminology "continuous reception (CRX)" refers to periods when. the WTRU is in continuous reception mode, (i.e., continuously monitoring HS-DSCH). This occurs when DRX operation is disabled, or when the DRX operation is enabled but the WTRU is in a receive burst part of the DRX pattern.

In accordance with one embodiment, the procedure for FACH measurement occasions is modified when the WTRU is allocated, and is using, E-DCH resources while in CELL_FACH. If the FACH measurement occasion overlaps with an E-DCH transmission period, the WTRU may terminate the E-DCH transmission prior to the FACH measurement occasion. The WTRU may signal this to the Node B, or the Node B may rely on the expiry of a timer to realize that the resources have been released.

Alternatively, the Node B may order the WTRU to terminate the E-DCH transmission just prior to the FACH measurement occasion. In addition, the Node B may also signal to the WTRU to restart E-DCH transmission immediately following the FACH measurement occasion and may also provide a pre-allocation of E-DCH resources for this WTRU. The WTRU may then use the newly allocated resources without contention resolution, (i.e., contention-free access).

Alternatively, the WTRU may disregard FACH measurement occasions when the WTRU has been allocated E-DCH resources and continuously uses the E-DCH resources and performs downlink reception during the FACH measurement occasions. As the Node B is aware that the E-DCH resources have been assigned to the WTRU and that the WTRU is disregarding this FACH measurement occasion, the Node B may continue downlink transmission to this WTRU.

The WTRU may mark 'K' frames (or alternatively Tk seconds or K transmission time intervals (TTIs)) prior to the FACH measurement occasion as unavailable for E-DCH transmission (unavailable window). In such a case, the WTRU may not start random access channel (RACH) power ramp up procedure during this period, thereby reducing the probability that a WTRU is assigned E-DCH resources during the FACH measurement occasion. This may be achieved by modifying the RACH power ramp-up procedure such that these slots are prohibited or less likely to be selected for RACH preamble transmission. Alternatively, the WTRU may perform a back-off when the WTRU determines that the RACH power ramp-up will start in the unavailable window. The specifics of the back-off may be hardcoded or configured through broadcast information.

Optionally, the parameter "K" (or alternatively "Tk") may be determined based on the amount of uplink data that shall be sent over E-DCH in CELL_FACH by the WTRU or based on the logical channel for which data will be sent in the uplink over E-DCH. For smaller amounts of data, (e.g., dedicated control channel (DCCH) messages), the parameter "K" should be shorter than that for larger amounts of data, (e.g., dedicated traffic channel (DTCH) data).

The Node B may mark frames (or alternatively Tk seconds or K TTIs) prior to the FACH measurement occasion as unavailable for E-DCH transmission. In such a case, the WTRU may perform a normal RACH ramp-up, but the Node B may not assign/allocate E-DCH resources to this WTRU if the resource usage overlaps the FACH measurement occasion. Instead the Node B may send the WTRU a negative acknowledgment (NACK) on an acquisition indicator channel (AICH), forcing the WTRU to perform a back-off and to retry at a later time. The specifics of the back-off may be hardcoded or configured through broadcast information.

Alternatively, if CELL_FACH is intended to be a transitory state, the network may configure E-DCH in CELL_FACH capable WTRUs not to make interfrequency and/or inter-RAT measurements.

In accordance with another embodiment, a WTRU in CELL_FACH with DRX enabled is allowed to perform inter-frequency and inter-RAT measurements during the DRX period. This means that the WTRU does not use the existing FACH measurement occasion to perform measurement on other frequencies and RATs, if the WTRU is DRX enabled. The WTRU links the DRX pattern with the inter-frequency and inter-RAT measurement periods (i.e. the periods defined by requirements), and wakes up during the measurement periods that fall into the DRX period and takes the required measurements. The measurements may be performed every N DRX period where N is an integer value configured by a higher layer, broadcasted, or predetermined by the WTRU, (e.g., N=1). The duration of the measurement period may be equal to the duration of the DRX period or may be longer than the DRX period.

Alternatively, the WTRU may use the same formula as in prior art to calculate the SFN to start the inter-frequency and inter-RAT measurements, but the WTRU may only start the measurement on the sub-frame or transmission time interval (TTI) corresponding to the beginning of the DRX period on the calculated SFN. If no DRX period starts on the calculated SFN, the WTRU may start measurement on the next closest DRX period after the calculated SFN. Alternatively, if no DRX period coincides with the calculated SFN the WTRU may take the inter-frequency or inter-RAT measurement at the beginning of the frame with the calculated SEN.

Alternatively, the WTRU in CELL_FACH may use the same RNTI (i.e., E-RNTI) in calculating the measurement periods, as in the DRX formula.

If the WTRU performs inter-frequency and inter-RAT measurements in periods that fall into the DRX period, the WTRU may not perform any measurements on other frequencies or RATS if DRX is disabled. In one possible embodiment, the WTRU may use the prior art formula to determine the measurement periods and perform measurements during the period that DRX is disabled.

In accordance with another embodiment, the WTRU in CELL_FACH state with DRX enabled may use the conventional FACH measurement occasion formula to determine the measurement periods and start performing the inter-frequency or inter-RAT measurements on a specific measurement period if one or a combination of the following conditions is satisfied:

(1) No additional condition, (i.e., the WTRU always measures during the FACH measurement occasion);

(2) if the WTRU has its receiver turned on according to the DRX pattern during the time the WTRU is configured to take a FACH measurement;

(3) if the WTRU has its receiver turned off according to the DRX pattern during the time the WTRU is configured to take a FACH measurement; and (4) if the WTRU has read system information from the network indicating that the measurement shall be taken regardless of whether the WTRU would be listening or not according to the DRX pattern.

In all the embodiments described herein, the WTRU may start performing the inter-frequency or inter-RAT measurements on a specific measurement period if one or a combination of the following conditions is satisfied:

(1) if a quality measure, (such as common pilot channel (CPICH) Ec/No, CPICH received signal code power (RSCP), etc.), for the reception in the cell to which the WTRU is connected falls below a threshold;

(2) if a quality measure of cell(s) monitored in the same frequency falls below a threshold, the WTRU may take inter-frequency measurements; or (3) if a quality measure of cell(s) monitored in different frequencies and the same frequency falls below a threshold, the WTRU may take inter-RAT measurements.

The threshold used to determine if the WTRU should start taking measurements on other frequencies or on other RATs may be equivalent to parameters $S_{intersearch}$ or $S_{searchRAT}$, respectively, that are broadcasted in system information block (SIB) 3/4 and used for WTRUs in CELL_PCH, URA_PCH and idle mode. Alternatively, new $S_{intersearch}$ or $S_{searchRAT}$ parameters may be signaled only for CELL_FACH WTRUs. Alternatively, the $S_{intersearch}$ or $S_{searchRAT}$ parameters for CELL_FACH may be derived based on the broadcasted $S_{intersearch}$ or $S_{searchRAT}$ for CELL/URA_PCH, (e.g., adjusted by N dB). For example, if the criteria to start measuring in CELL-FACH needs to be less conservative than in CELL_PCH, the $S_{intersearch}$ for CELL_FACH may be N dB higher.

DRX operation in CELL_FACH state may be configured, (i.e., variable HS_DSCH-DRX_CELL_FACH_STATUS is set to TRUE), when a WTRU is in the CELL-FACH state, has a dedicated HS-DSCH radio network temporary identity (H-RNTI), and has received an information element (IE) "HS-DSCH DRX in CELL_FACH information" from system information block (SIB) Type 5 or SIB Type 5 bis. The variable HS_DSCH_DRX_CELL-FACH_STATUS indicates whether HS-DSCH DRX operation is supported in CELL_FACH. The parameters in "HS-DSCH DRX in CELL_FACH Information" configure the WTRU in CELL_FACH state to discontinuously receive HS-DSCH.

If HS_DSCH_DRX_CELL_FACH_STATUS is set to TRUE, a WTRU will operate in a DRX mode. The WTRU disables DRX and receives continuously if E-DCH resources have been allocated to the WTRU, or if an inactivity timer (referred to as timer T321) is running. T321 timer is a timer used to determine the time the WTRU waits until reinitiating DRX operation after DRX interruption. T321 timer starts following release of E-DCH resources. The network has an option of starting/restarting the T321 timer based on downlink activity (i.e., reception of HS-DSCH data). This is configured if the network broadcasts the IE "DRX Interruption by HS-DSCH data" set to TRUE.

Upon expiry of T321 timer and if E-DCH resources have not been allocated, the WTRU may start receiving according to the DRX pattern. The WTRU may receive HS-DSCH during the frame(s) with the SFN value fulfilling the following:

$$(SFN\text{-}H\text{-}RNTI) \bmod DRX\_cycle < Rx\_burst; \qquad \text{Equation (3)}$$

where H-RNTI is the value stored in the variable H_RNTI, DRX_cycle is the length of the DRX cycle in radio frames, signaled by the IE "HS-DSCH DRX cycle$_{FACH}$," and Rx burst is the period in frames within the DRX cycle, in which the WTRU receives HS-DSCH, signaled by the IE "HS-DSCH Rx burst$_{FACH}$."

If a WTRU with DRX configured is only to take inter-frequency and inter-RAT measurements during DRX periods, as described by Equation (3), the WTRU will be in CRX when E-DCH resources are allocated or inactivity timer (T321) is running. If the network configures HS-DSCH downlink activity to restart the T321 timer, it is possible to have long periods of continuous reception if the network is intermittently sending downlink data for a long period of time. This continuous reception will prevent the WTRU from taking inter-frequency and inter-RAT measurements, since the WTRU will not have any DRX periods to take the measurements on.

In accordance with one embodiment, the WTRU is configured and allowed to take inter-frequency and inter-RAT measurements in FACH measurement occasions during the periods when DRX is disabled. Running the T321 timer indicates that continuous reception is ongoing and that the WTRU does not have an E-DCH resource allocated. In accordance with this embodiment, the WTRU is allowed to take measurements when the timer T321 is ongoing. Optionally, the inter-frequency or inter-RAT measurements may be allowed only when the network configures the WTRUs to allow downlink activity to restart the inactivity timer (T321 timer).

If the WTRU is allowed to take measurements when DRX is disabled, (i.e., when T321 timer is ongoing), a measurement pattern has to be configured and known by both the WTRU and the network. The WTRU may use one or a combination of the following methods to determine the time in which measurements should be taken. When DRX disabled, the WTRU may use the conventional FACH measurement occasion, (i.e., as defined in section 8.5.11 of 3GPP TS 25.331 V8.0.0), to determine when to take inter-RAT and inter-frequency measurements. When entering a DRX period, the WTRU reverts to using the DRX period to take these measurements. More generally, if variable HS_D-SCH_DRX_CELL_FACH_STATUS is set to FALSE, or HS_DSCH_DRX_CELL_FACH_STATUS is set to TRUE and timer T321 is ongoing (and optionally, the IE "DRX Interruption by HS-DSCH data" is TRUE), the WTRU may perform measurements on other frequencies or other RATs according to the IE "FACH measurement occasion info." Otherwise, the WTRU performs measurements on other frequencies or other RATs during the frame(s) with the SFN value not fulfilling Equation (1).

Alternatively, the WTRU may not take any measurements when DRX is disabled. The measurements are only taken once DRX periods begin, (i.e., T321 expires). Alternatively, the WTRU may make use of a new formula known by both the network and the WTRU to take measurements during the time DRX is disabled.

Alternatively, the WTRU may be configured to take measurements on the x first frame(s) in which the DRX frame would coincide after the last reception frame if DRX operation was ongoing. x may be a pre-determined value and specified in the WTRU and network, (e.g., x =1). FIG. 1 shows an example implementation in accordance with this embodiment where the WTRU performs measurements while in continuous reception (without E-DCH resources allocated), in which the measurement periods are determined according to the last alternative discussed above. The lower part of FIG. 1 shows how the WTRU would operate if the WTRU was in DRX, (i.e., DRX is not disabled by reception of HS-DSCH). In this example, the HS-DSCH DRX cycle is 4 frames and the Rx burst is 2 frames. Frames 102 are the frames that the WTRU monitors the HS-DSCH and the frames 104 are the DRX periods associated with the DRX pattern. Frames 106 are the measurement frames in which the WTRU performs measurements to other frequencies and RATs. As shown in FIG. 1, the WTRU performs measurements while DRX is disabled, (i.e., while T321 timer is running), during the frame, (Frames 3 and 7 in this example) that would coincide with the DRX frame if the DRX was not disabled by the reception of HS_DSCH. Optionally, the measurement frames may also correspond to the x DRX frame preceding the listening frame.

Figure 2:
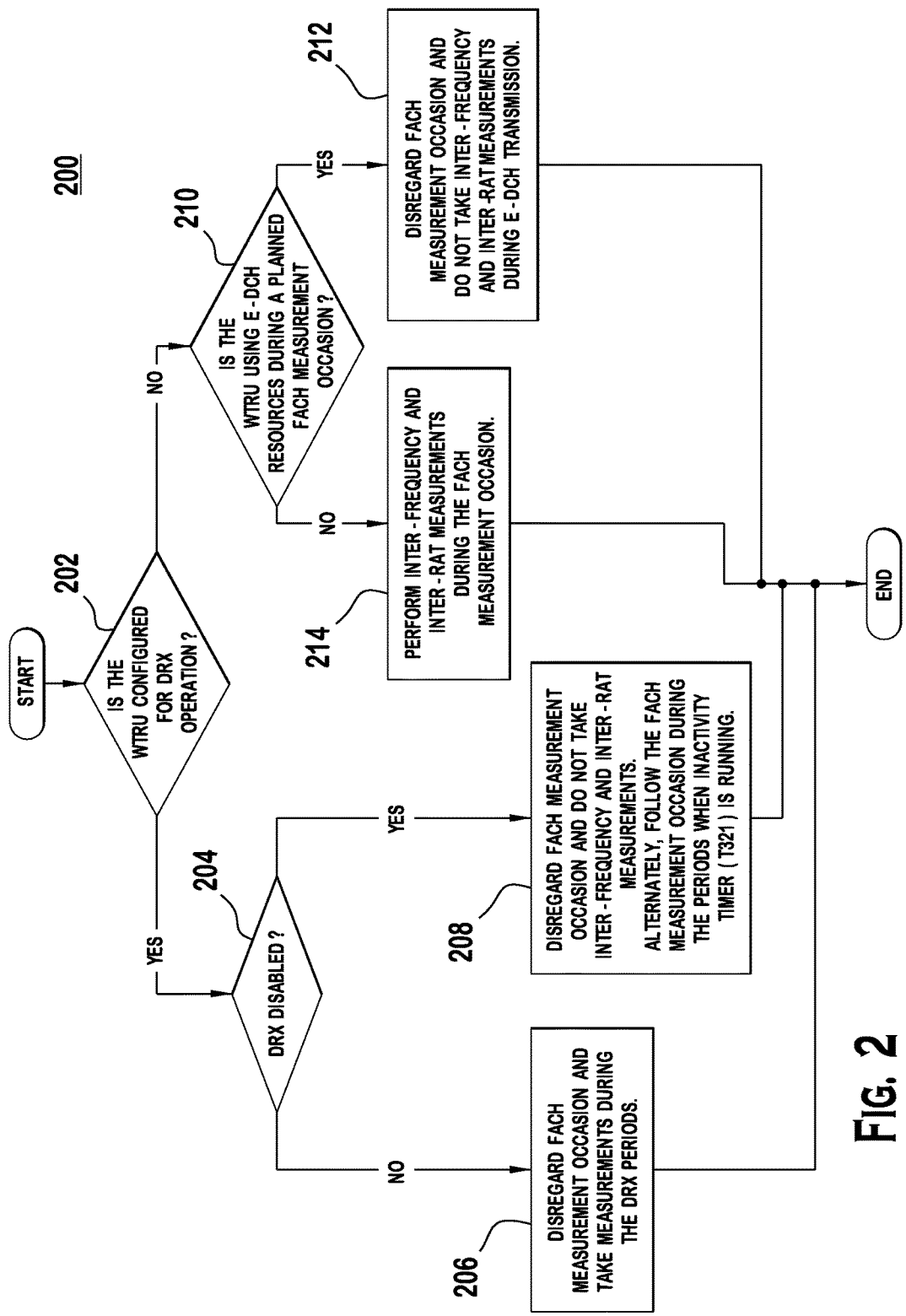
FIG. 2 is a flow diagram of an example process of performing inter-frequency and inter-RAT measurements while in CELL_FACH.

FIG. 2 is a flow diagram of an example process 200 of performing inter-frequency and inter-RAT measurements while in CELL_FACH in accordance with the embodiments disclosed above. When it is determined that a DRX operation is configured, (e.g., if the WTRU and the network both support DRX in CELL-FACH and the WTRU and the network both support E-DCH in CELL_FACH and IDLE mode, or if the WTRU and the network both support DRX in CELL_FACH and the network allows downlink activity to start and restart T321 timer, (i.e., IE "DRX Interruption by HS-DSCH data" is TRUE)) (step 202), and if a DRX is not disabled (step 204), the WTRU may disregard FACH measurement occasion and take measurement during the DRX periods (step 206). If a DRX is disabled (step 204), the WTRU may follow the FACH measurement occasions when the inactivity timer (T321) is running, or alternatively the WTRU may disregard FACH measurement occasion and do not take inter-frequency or inter-RAT measurements (step 208).

When a DRX operation is not configured, (e.g., if the WTRU or the network does not support DRX in CELL_FACH, or if the WTRU and the network both support DRX in CELL_FACH but the WTRU or the network does not support E-DCH in CELL_FACH and the network does not allow downlink activity to start/restart T321 timer, (i.e., IE "DRX Interruption by HS-DSCH data" is FALSE)) (step 202), if the WTRU is using E-DCH resources during a planned FACH measurement occasion, the WTRU may disregard FACH measurement occasion and not take inter-frequency or inter-RAT measurements (step 212). If the WTRU is not using the E-DCH resources during the planned FACH measurement occasion, the WTRU perform inter-frequency and inter-RAT measurements during the FACH measurement occasion (step 214).

Figure 3:
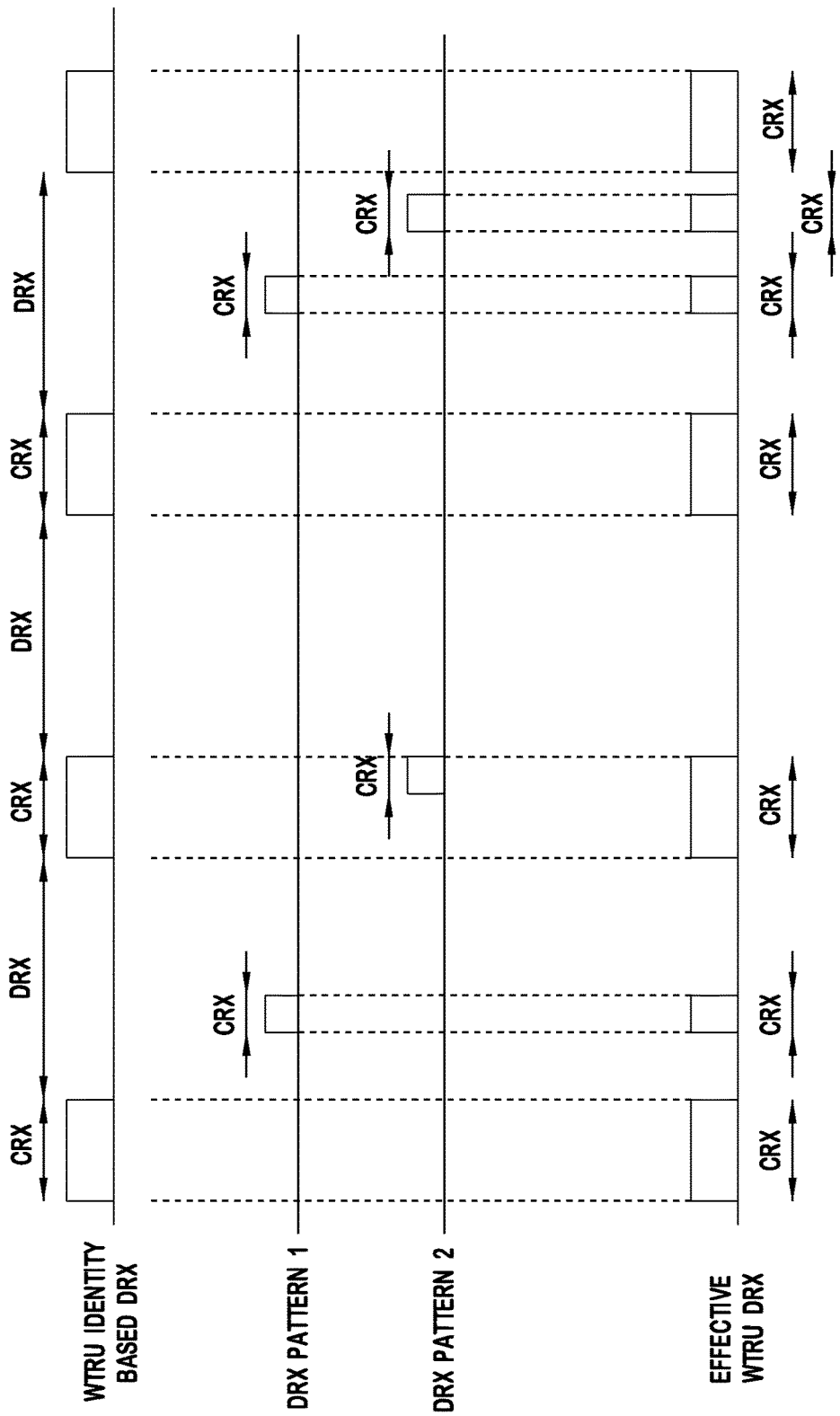
FIG. 3 shows a common CELL_FACH DRX pattern used in concert with a WTRU identity-based DRX.

Methods that allow the WTRU to be able to receive common traffic, (i.e., synchronize the DRX patterns), while DRX is configured are described hereinafter. In accordance with one embodiment, the cell may have one or more supplementary CELL_FACH DRX pattern(s), common to all WTRUs. All WTRUs in the cell wake up at the same time and listen if any common message such as BCCH, (e.g., SYSTEM INFORMATION CHANGE INDICATION message, or reading a system information block due to a validity timer expiring (i.e., SIB7), etc.), is being sent. This common CELL_FACH DRX pattern may be periodic and define periods over which all WTRUs are required to be in CRX mode. The common CELL_FACH DRX pattern may be broadcast as part of the cell-based system information. The common CELL_FACH DRX pattern may be used in concert with the WTRU identity-based DRX as shown in FIG. 3 such that a WTRU operates in a receive burst as long as at least one of the DRX patterns the WTRU has to follow points to a receive burst. The DRX patterns are configured ensuring that there is a minimum set of periods on which the network may count on the WTRU to be in receive burst. A distinct common DRX pattern may be assigned for BCCH traffic (DRX_pattern_1), for CCCH traffic (DRX_pattern_2), and for MBMS related traffic (DRX_pattern_3). For BCCH and CCCH traffic, the frequency of these patterns may be based on the relative occurrences of each of the message types. For MBMS traffic, the frequency may be based on the schedule for the MBMS data.

The common DRX pattern may be determined based on the Cell ID broadcasted in the system information blocks over the BCCH. Alternatively, the common DRX pattern may be based on the cell-based BCCH-specific H-RNTI. The parameters for the common DRX pattern, (e.g., DRX cycle and Rx burst), may be hardcoded, signaled by the network through system information or dedicated RRC signaling, or based on same scaling of the WTRU-specific parameters.

Alternatively, since the network may not want the WTRU to wake up as often and break the normal DRX cycle in order to read some common traffic, the network may configure the WTRU to have a DRX cycle of N*WTRU-specific DRX cycle to read common traffic, where N may be a predetermined or configured value. The WTRU follows the WTRU dedicated DRX patterns and every N-th DRX cycle the WTRU wakes up and attempts to read the common traffic. The common traffic includes BCCH traffic, (such as system information block 7), that is required to be read by WTRUs regularly, according to a validity timer. In order to avoid breaking the DRX cycle of the WTRU to acquire this common SIB7, the WTRU only wakes up every N-th DRX cycle. At the N-th DRX cycle the WTRU may wake up and wait until SIB7 is acquired or the WTRU may wait and stay in DRX until the scheduling period of the SIB arrives and then reads the SIB. After reading the SIB the WTRU continues the normal DRX cycle.

A WTRU is in continuous reception as specified by the dedicated DRX pattern and the common DRX pattern. The common DRX pattern may be cell-specific or may be common across the system or portion of the system.

Alternatively, all WTRU identity-based DRX patterns may be configured such that they have a synchronized continuous reception period. For instance, the DRX patterns may be defined that after every K frames, a WTRU is in a receive burst for L consecutive frames. The values of K and L may be hardcoded, configured through RRC signaling, or broadcast in system information. L should be large enough to ensure that all WTRUs will be in receive burst for at least one common frame. This may be useful for BCCH traffic.

Figure 4:
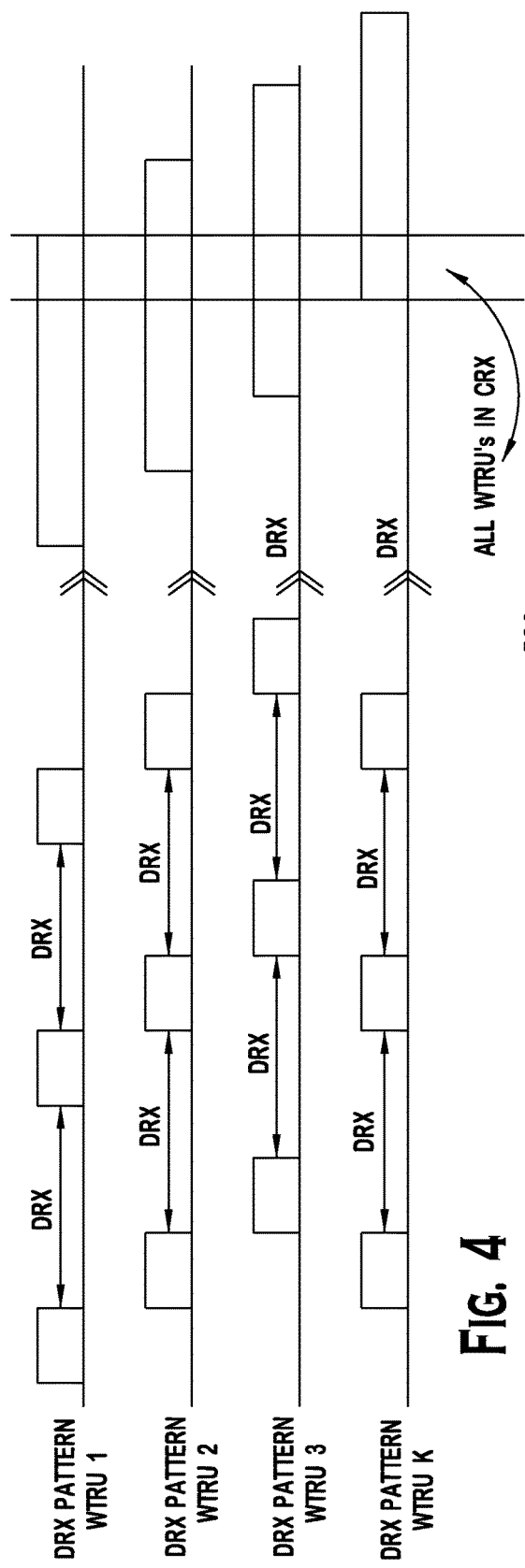
FIG. 4 shows WTRU identity-based DRX period configuration.

FIG. 4 shows WTRU identity-based DRX period configuration in accordance with this embodiment.

For all embodiments disclosed above, when the WTRU receives a SYSTEM INFORMATION CHANGE INDICATION message or the WTRU is required to read the system information block such as SIB7 according to the cycles described in the embodiments above, the WTRU may be configured to disable DRX until an updated SIB has been successfully read. Once the WTRU successfully reads the updated SIB, the WTRU may enable DRX again and continue with the configured DRX periods. Alternatively, the WTRU may continue DRX operation until the known scheduling period of the updated SIB. In cases where the SIB is scheduled to be transmitted rarely, it may be beneficial for the WTRU to stay in DRX until the time at which the SIB is scheduled to be sent. When the WTRU determines that the SIB is being scheduled and transmitted, the WTRU moves out of DRX in order to read the updated SIB.

In accordance with another embodiment, prior to sending the common traffic, the network may order or signal the WTRUs to come out of DRX mode. The network has to reach each of the WTRUs while they are in CRX. The signaling may be accomplished through RRC signaling, (e.g., SYSTEM INFORMATION CHANGE INDICATION), medium access control (MAC) layer signaling. (e.g., in a MAC header), or a high speed shared control channel (HS-SCCH) order or some other physical layer signaling. Any of the embodiments to synchronize DRX patterns can be used to guarantee that all WTRUs receive the wake-up order.

Upon reading the wake-up order, the WTRU stays in CRX. After receiving the common traffic, the WTRU reverts back to following the DRX pattern (re-enables DRX operation). There are numerous options for re-enabling DRX operation. The WTRU may return to following the DRX pattern after a timer expires, after reception of K MAC protocol data units (PDUs), or based on an order/signal from the network (using either RRC signaling, MAC signaling, or some physical layer method).

The CRX period may be tied to the type of common traffic that is to be transmitted. For instance, for BCCH traffic, the CRX period may last until the WTRU has received a MAC PDU using the BCCH-specific H-RNTI. For MBMS traffic, the WTRU may stay in DRX until ordered by the network.

All parameters, (i.e., timers, number of PDUs K, etc.), may be either hardcoded, configured through RRC signaling, or broadcast as part of system information.

Figure 5:
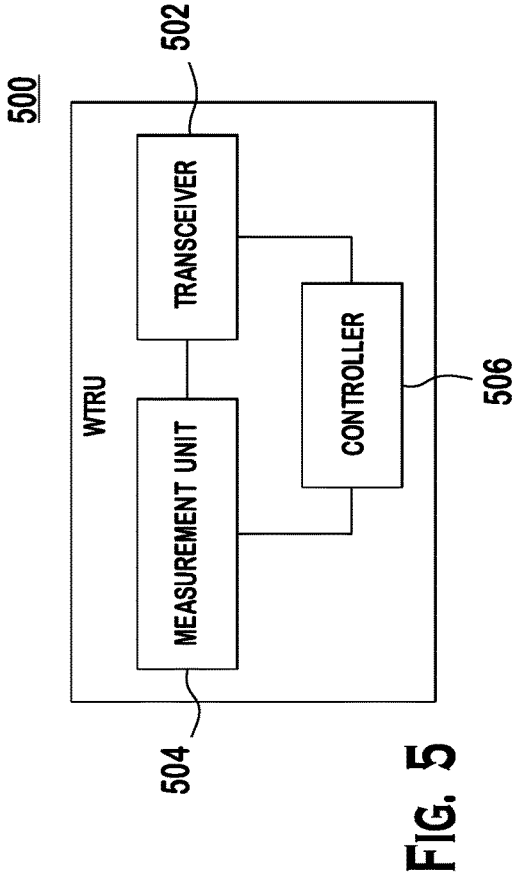
FIG. 5 is a block diagram of an example WTRU.

FIG. 5 is a block diagram of an example WTRU 500 configured to perform DRX and downlink inter-frequency and inter-RAT measurements in CELL_FACH state in accordance with embodiments disclosed above. The WTRU 500 includes a transceiver 502, a measurement unit 504 and a controller 506. The transceiver 502 is for transmitting and receiving a signal. The measurement unit 504 is configured to perform inter-frequency and inter-RAT measurements in a measurement period. The controller 506 is configured to perform the control functions disclosed above. The controller 506 is configured to control the transceiver to periodically wake up for downlink reception in CELL_FACH state in accordance with a configured DRX pattern, and calculate a measurement period for performing inter-frequency and inter-RAT measurements, such that the measurement unit performs the inter-frequency and inter-RAT measurement in a DRX period.

The controller 506 may be configured to control the transceiver to periodically wake up for receiving HS-DSCH in CELL_FACH state such that the inter-frequency and inter-RAT measurements are performed while T321 timer is running. The controller 506 may be configured to control the transceiver to periodically wake up for downlink reception in CELL_FACH state in accordance with a common DRX pattern that is common to all WTRUs in a cell. The controller 506 may be configured to control the transceiver to wake up upon reception of an order to come out of DRX to receive a common traffic.

The controller 506 may be configured to calculate the measurement period for performing inter-frequency and inter-RAT measurements, and to disregard a measurement occasion overlapping with an E-DCH transmission period.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method to determine a measurement action associated with a CELL_FACH state by a wireless transmit/receive unit (WTRU), the method comprising:
   determining whether DRX operation is configured in a CELL_FACH state;
   performing, via the wireless transmit/receive unit (WTRU), at least one of an inter-frequency measurement or an inter-RAT measurement in accordance with a first measurement time when it is determined that DRX operation is configured; and
   performing, via the wireless transmit/receive unit (WTRU), at least one of an inter-frequency measurement or an inter-RAT measurement in accordance with a second measurement time when it is determined that DRX operation is not configured.

2. The method of claim 1, wherein the first measurement time is a frame with an SFN value that fulfills the following: (SFN-H_RNTI) mod DRX_cycle<Rx_burst.

3. The method of claim 1, wherein the second measurement time is provided in a FACH measurement occasion info information element.

4. The method of claim 1, further comprising:
   determining whether a quality measure is below a threshold; and
   performing one of the measurements when the quality measure falls below the threshold.

5. The method of claim 4, wherein the threshold is equivalent to parameter Sintersearch broadcast in system information.

6. The method of claim 4, wherein the quality measure relates to at least one of a cell in a same frequency or a cell in a different frequency.

7. The method of claim 4, wherein the threshold is equivalent to parameter SsearchRAT broadcast in system information.

8. The method of claim 1, wherein the first measurement time is during a DRX period.

9. The method of claim 1, wherein the second measurement time is during a FACH measurement occasion.

10. A wireless transmit/receive unit (WTRU) configured to determine a measurement action associated with a CELL_FACH state, the WTRU comprising:
    a processor configured to:
    determine whether DRX operation is configured in a CELL_FACH state; and
    a receiver configured to:
    perform at least one of an inter-frequency measurement or an inter-RAT measurement in accordance with a first measurement time when it is determined that DRX operation is configured; and
    perform at least one of an inter-frequency measurement or an inter-RAT measurement in accordance with a second measurement time when it is determined that DRX operation is not configured.

11. The WTRU of claim 10, wherein the first measurement time is a frame with an SFN value that fulfills the following: (SFN-H_RNTI) mod DRX_cycle<Rx_burst.

12. The WTRU of claim 10, wherein the second measurement time is provided in a FACH measurement occasion info information element.

13. The WTRU of claim 10, wherein:
    the processor is further configured to determine whether a quality measure is below a threshold; and
    the receiver is further configured to perform one of the measurements when the quality measure falls below the threshold.

14. The WTRU of claim 13, wherein the threshold is equivalent to parameter Sintersearch broadcast in system information.

15. The WTRU of claim 13, wherein the quality measure relates to at least one of a cell in a same frequency or a cell in a different frequency.

16. The WTRU of claim 13, wherein the threshold is equivalent to parameter SsearchRAT broadcast in system information.

17. The WTRU of claim 10, wherein the first measurement time is during a DRX period.

18. The WTRU of claim 10, wherein the second measurement time is during a. EACH measurement occasion.

* * * * *